United States Patent
Pan et al.

(10) Patent No.: US 7,079,670 B2
(45) Date of Patent: Jul. 18, 2006

(54) APPARATUS AND METHOD FOR AUTHENTICATING A USER BY EMPLOYING FEATURE POINTS OF A FINGERPRINT IMAGE OF THE USER

(75) Inventors: Sung Bum Pan, Seoul (KR); Youn-Hee Gil, Masan-si (KR); Dae Sung Moon, Busan (KR); Yongwha Chung, Daejeon (KR); Kyo Il Chung, Daejeon (KR); Chee Hang Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 698 days.

(21) Appl. No.: 10/184,875

(22) Filed: Jul. 1, 2002

(65) Prior Publication Data

US 2003/0103658 A1 Jun. 5, 2003

(30) Foreign Application Priority Data

Dec. 5, 2001 (JP) .............................. 2001-76460

(51) Int. Cl.
*G06K 9/00* (2006.01)
(52) U.S. Cl. ...................... 382/124; 235/380; 713/186; 713/202
(58) Field of Classification Search ................ 235/380; 382/115, 124, 125; 713/186, 202
See application file for complete search history.

(56) References Cited

U.S. PATENT DOCUMENTS

| | | | | |
|---|---|---|---|---|
| 5,613,014 A | * | 3/1997 | Eshera et al. | ................ 382/124 |
| 5,848,176 A | * | 12/1998 | Hara et al. | .................. 382/124 |
| 5,887,140 A | * | 3/1999 | Itsumi et al. | ................ 709/225 |
| 6,041,056 A | * | 3/2000 | Bigham et al. | ......... 370/395.64 |
| 6,134,340 A | * | 10/2000 | Hsu et al. | .................... 382/124 |
| 6,182,892 B1 | * | 2/2001 | Angelo et al. | .............. 235/380 |
| 6,185,318 B1 | | 2/2001 | Jain et al. | |

(Continued)

FOREIGN PATENT DOCUMENTS

JP       8083342       3/1996

(Continued)

OTHER PUBLICATIONS

Nalini K. Ratha, Kalle Karu, Shaoyun Chen, and Anil K. Jain; *A Real-Time Matching System for Large Fingerprint Databases*; IEEE Transactions on Pattern Analysis and Machine Intelligence, vol. 18, No. 8; Aug. 1996; pp. 799-813.

(Continued)

*Primary Examiner*—Matthew C. Bella
*Assistant Examiner*—Gregory Desire
(74) *Attorney, Agent, or Firm*—Mayer, Brown, Rowe & Maw LLP (57) ABSTRACT

In an apparatus for authenticating a user by employing feature points of a fingerprint image of the user, a fingerprint image input circuit scans a fingerprint of a user to be registered to provide a first fingerprint image and a fingerprint of a user to be authenticated to provide a second fingerprint image. A host provides registered feature points data corresponding to the first fingerprint image and target feature points data corresponding to the second fingerprint image. A security token circuit estimates a position difference and a direction difference between pairs of a registered feature point and a target feature point and corrects the two feature points based on the position difference and the direction difference to provide authentication result data.

12 Claims, 4 Drawing Sheets

U.S. PATENT DOCUMENTS

| | | | |
|---|---|---|---|
| 6,233,348 B1 * | 5/2001 | Fujii et al. | 382/125 |
| 6,360,953 B1 * | 3/2002 | Lin et al. | 235/492 |
| 6,681,034 B1 * | 1/2004 | Russo | 382/125 |
| 6,707,934 B1 * | 3/2004 | Takeda et al. | 382/124 |
| 6,721,891 B1 * | 4/2004 | Borza | 713/202 |
| 6,757,410 B1 * | 6/2004 | Nakashima | 382/124 |
| 6,799,275 B1 * | 9/2004 | Bjorn | 713/186 |
| 6,876,757 B1 * | 4/2005 | Yau et al. | 382/125 |
| 6,954,553 B1 * | 10/2005 | Ikegami | 382/224 |
| 2003/0103658 A1 * | 6/2003 | Pan et al. | 382/124 |

FOREIGN PATENT DOCUMENTS

| | | |
|---|---|---|
| KR | 1997-17035 | 4/1997 |
| KR | 1999-74776 | 10/1999 |
| KR | 2000-60758 | 10/2000 |

OTHER PUBLICATIONS

Illingworth et al.; "The Adaptive Hough Transform", IEEE Transactions on Pattern Analysis and Machine Intelligence; Sep. 1987; pp. 690-698.

Ratha et al.; "A Real-Time Matching System for Large Fingerprint Databases"; IEEE Transactions on Pattern Analysis and Machine Intelligence; Aug. 1996; pp. 799-812.

European Search Report of EP02254683.

* cited by examiner

APPARATUS AND METHOD FOR AUTHENTICATING A USER BY EMPLOYING FEATURE POINTS OF A FINGERPRINT IMAGE OF THE USER

FIELD OF THE INVENTION

The present invention relates to an apparatus and method for authenticating a user by employing feature points of a fingerprint image of the user; and, more particularly, an apparatus and method for authenticating a user by correcting a phase of a registered fingerprint image to be identical with that of a target fingerprint image, i.e., a fingerprint image to be authenticated and thereafter, comparing feature points of the above-mentioned two fingerprint images in order to estimate similarity between the registered fingerprint image and the target fingerprint image under an environment in which hardware resources of a smart card, a universal serial bus (USB) token or the like are limited.

BACKGROUND OF THE INVENTION

In a conventional fingerprint authentication system, a fingerprint image of a user is first registered in a security token such as a smart card, a universal serial bus (USB) token or the like and then without an outflow information of a registered fingerprint image data of the user, the registered fingerprint image and a target finger print image, i.e., a fingerprint image to be authenticated are compared to each other. The comparison result obtained in the above-mentioned conventional user authentication apparatus is transmitted to outside. This apparatus guarantees higher security than a system in which a central processing unit therein manages fingerprint image data or a system in which registered fingerprint image data is transmitted to an authentication performing circuit in outside thereof. Further, this apparatus can cut off outflow of living body data to thereby protect security of the living body data.

In conventional authentication methods by employing comparison between a registered fingerprint image and a target fingerprint image, methods to estimate similarity between feature points of the registered fingerprint image and those of the target fingerprint image are gaining popularity. For example, in a conventional authentication method, all the feature points extracted from two fingerprint images are checked in view of positions and directions thereof and then similarity between feature points of the registered fingerprint image and those of the target fingerprint image are estimated. The estimated similarity is compared to a predetermined threshold. This method is based on the assumption that the fingerprint image input is carried out in a same position and same direction. Under this assumption, phases of feature points are compared. Accordingly, this method requires that the two fingerprint images should be corrected or amended as ones having same position and direction.

Examples of the methods described in the above are as follows. Namely, there are an article entitled "A real-time matching system for large fingerprint database", IEEE transactions on pattern analysis and machine intelligence, vol. 18, No. 8, August 1996; Korean Patent Registration NO. 10-0267263 entitled Fingerprint image comparison method free from influence of rotation and transition thereof; and Korean Patent Registration NO.: 10-0198108 entitled "Passing management apparatus by employing fingerprint image and an IC card of a user".

In detail, in a method described in the article entitled "A real-time matching system for large fingerprint database", first and second feature points are extracted from registered fingerprint image and target fingerprint image, respectively. Then, the extracted first and second feature points are corrected. When estimating similarity between two fingerprint images by comparing the first and second feature points, the estimation accuracy is enhanced when the two fingerprint images are obtained with a same position and direction.

Since, however, different fingerprint images have generally different positions and directions from each other, a correction procedure for the positions and directions thereof should be added prior to estimation of the similarity. The so-called Hough Transform technique can be applied in the correction procedure to obtain differences in positions and directions.

In detail, a three dimensional region including a bin representing differences of positions and directions is allocated on a memory. Differences of positions and directions of each pair of two feature points are obtained and then accumulated in a corresponding bin within a region. Accumulations for all pairs of two feature points are obtained and then, a bin having a maximum value is obtained as a maximum bin value. Then, correction of positions and directions for the two feature points are carried out with reference to the maximum bin value. However, in this method, since a memory burden greatly increases because a considerable amount of memory is required to allocate the three dimensional region for accumulating differences of positions and directions. Accordingly, this method cannot be applied on a security token having limited hardware resources such as a smart card or a USB token.

Next, the Korean Patent Registration NO. 10-0267263 describes a fingerprint image comparison method free from influence of rotation and transition thereof. This method relates to a fingerprint image comparison method for estimating whether a pair of two fingerprint images is same or not quickly by using feature points data previously extracted from fingerprint images and detecting corresponding points providing information of rotation and transition of the fingerprint images.

In a conventional fingerprint image comparison method, coordinates of all the extracted feature points are checked and accordingly, a lot of calculation burden is entailed in order to check all the candidate feature points having same positions in a space. In the above-mentioned patent, all the feature points are grouped into three parts and a radius of a circumscribed circle for each group, the radius data being stored and utilized in a database. In the patent, when comparing two fingerprint images, the identification between fingerprint images distorted by rotation and/or translation can be checked by selecting only a group including feature points having similar radiuses and quickly checking whether same fingerprint images exist or not. But, in the patent, since there is further needed a memory for storing information of feature point groups. As a result, this method cannot be substantially applied on a security token.

Meanwhile, the Korean Patent Registration NO. 10-0198108 relates to an apparatus for identifying a user by using a fingerprint image and an IC card. In this patent, a user to use a card first registers or stores his or her own fingerprint image. Then, when the user intends to identify himself or herself, a fingerprint image instantly inputted to a card reader is compared with the previously registered fingerprint image in an IC card in a security system. But, the comparison process is performed outside the security system, there entails possibility of outflow of the fingerprint image data.

In view of the foregoing, in the conventional authentication methods mentioned above, there entails problems such as memory burden increase and possibility of outflow of the user's crucial identification data, e.g., fingerprint data as a living body data of the user.

SUMMARY OF THE INVENTION

It is, therefore, an object of the present invention to provide an apparatus and method for authenticating a user by correcting a phase of a registered fingerprint image to be identical with that of a target fingerprint image, i.e., a fingerprint image to be authenticated and thereafter, comparing feature points of the two fingerprint images in order to estimate similarity between the registered fingerprint image and the target fingerprint image under an environment in which hardware resources of a smart card, a universal serial bus (USB) token or the like are limited.

In accordance with one aspect of the present invention, there is provided an apparatus for authenticating a user by employing feature points of a fingerprint image of the user, including:

a fingerprint image input circuit for scanning a fingerprint of a user to be registered, thereby providing a first fingerprint image and scanning a fingerprint of a user to be authenticated, thereby providing a second fingerprint image;

a host circuit for providing data for feature points of the first fingerprint image having been registered as registered feature points data corresponding to the first fingerprint image and data for feature points of the second fingerprint image to be authenticated as target feature points data corresponding to the second fingerprint image;

a security token circuit for estimating a position difference and a direction difference between pairs of a registered feature point and a target feature point and correcting the two feature points based on the position difference and the direction difference to thereby provide authentication result data to the host circuit; and an I/O interfacing circuit for performing interfacing fingerprint images between the fingerprint image input circuit and the host and feature points data and authentication result data between the host and the security token circuit.

In accordance with another aspect of the present invention, there is provided a method for authenticating a user by employing feature points of a fingerprint image of the user for use in a system including a fingerprint image input circuit, a host and a security token circuit, the method comprising the steps of:

(a) registering feature points data of a fingerprint image of the user as registered feature points data into the security token circuit;

(b) inputting a fingerprint of a user to be authenticated into the fingerprint image input circuit;

(c) scanning the fingerprint of the user to thereby provide scanned fingerprint image data to the host;

(d) receiving the scanned fingerprint image data and extracting feature points from the scanned fingerprint image data and then selecting desired feature points in a predetermined manner from the extracted feature points to thereby provide the desired feature points data as target feature points data to the security token circuit;

(e) in the security token circuit, estimating the registered feature points data and the target feature points data, thereby obtaining a position difference and a direction difference of each pair of two feature points and then the differences for all pairs of two feature points are accumulated in a corresponding bin within a memory region and then obtaining a bin having a maximum value as a maximum bin value and by varying a unit of a bin starting from a large initial value to a smaller value, thereby setting a new region and then repeating this process until the unit of a bin reaches to a minimum value and thereafter, when the unit of bin reaches to the minimum value within a corresponding new region, obtaining final differences of positions and directions of each pair of two feature points; and correcting the feature points of the two fingerprint images based on the obtained differences; and estimating a similarity between the corrected feature points to thereby generate authentication result data; and providing the authentication result data to the host.

BRIEF DESCRIPTION OF THE DRAWINGS

The above and other objects and features of the present invention will become apparent from the following description of preferred embodiments, given in conjunction with the accompanying drawings, in which.

DETAILED DESCRIPTION OF THE PREFERRED EMBODIMENTS

Referring to FIGS. 1 to 4, preferred embodiments of the present invention will be described in detail.

Figure 1:
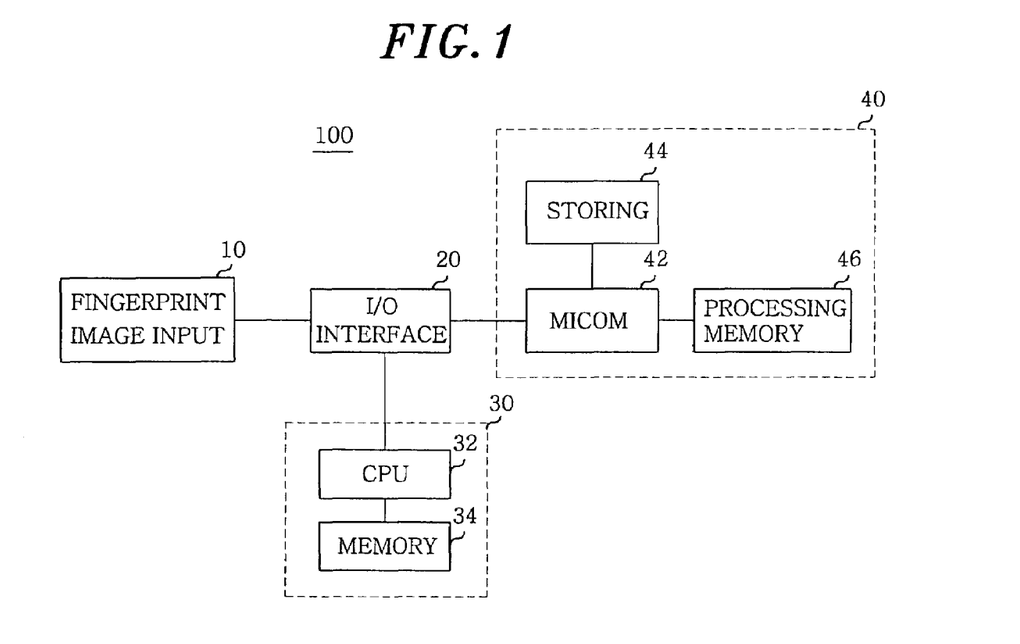
FIG. 1 shows a block diagram of an apparatus for authenticating a user by employing feature points of a fingerprint image of the user.

FIG. 1 shows a block diagram of an apparatus 100 for authenticating a user by employing feature points of a fingerprint image of the user in accordance with the present invention. The apparatus 100 includes a fingerprint image input circuit 10, an input/output (I/O) interface 20, a host 30 and a security token circuit 40.

The fingerprint image input circuit 10 scans a fingerprint of a user to be registered to thereby provide a first fingerprint image to the host 30 through the I/O interface 20. The fingerprint image input circuit 10 also scans a fingerprint of a user to be authenticated to thereby provide a second fingerprint image to the host 30 through the I/O interface 20. The I/O interface 20 performs interfacing between the fingerprint image input circuit 10 and the host 30 and carries out interfacing between the host 30 and the security token circuit 40 with feature points data and authentication result data.

The host 30 provides data for feature points of the first fingerprint image having been registered as registered feature points data corresponding to the first fingerprint image and data for feature points of the second fingerprint image to be authenticated corresponding to the second fingerprint image.

The host 30 may have a CPU 32 and a memory 34. The CPU 32 receives the first fingerprint image from the fingerprint image input circuit 10 of a user and extracts feature points from the first fingerprint image. The CPU 32 selects desired feature points in a predetermined manner from the extracted feature points to thereby provide data for feature points of the fingerprint image having been registered (hereinafter referred to as registered feature points data) to the memory 34 and the security token circuit 40 through the I/O interface 20.

Thereafter, the CPU 32 receives the second fingerprint image from the fingerprint image input circuit 10 of a user and extracts feature points from the second fingerprint image. The CPU 32 selects desired feature points in a predetermined manner from the extracted feature points to thereby provide data for feature points of the fingerprint image to be authenticated (hereinafter referred to as target feature points data) to the memory 34 and the MICOM 42 through the I/O interface 20. The memory 34 stores therein the registered feature points data and the target feature points data. A smart card or a universal serial bus (USB) token can be used as the security token circuit 40.

The security token circuit 40 estimates a position difference and a direction difference between pairs of two feature points, i.e., a registered feature point and a target feature point and corrects the two feature points based on the position difference and the direction difference to thereby provide authentication result data to the host 30.

The security token circuit 40 may have a storing unit 44, a micro-computer (MICOM) 42 and a processing memory 46. The MICOM 42 feeds the registered feature points data received from the host 30 to the storing unit 44 and receives the target feature points data from the host 30. The MICOM 42 retrieves the registered feature points data previously stored in the storing unit 44 and loads the registered feature points data in the processing memory 46. Then, the MICOM 42 compares the registered feature points data loaded in the processing memory 46 with the target feature points data to thereby generate authentication result data.

In detail, this authentication result data can be obtained as follows. A position difference and direction difference of each pair of two feature points are obtained, e.g., by employing the so-called Hough Transform technique and then the differences are accumulated in a corresponding bin within a memory region. Accumulations for all pairs of two feature points are obtained and then, a bin having a maximum value is obtained as a maximum bin value.

A unit of a bin is varied starting from a large initial value to a smaller value, thereby setting a new region. This process is repeated until the unit of a bin reaches to a minimum value. Then, when the unit of bin reaches to the minimum value, within a corresponding new region, final differences of positions and directions of each pair of two feature points are obtained. Thereafter, feature points of the two fingerprint images are corrected based on the obtained differences. There are estimated a similarity between the corrected feature points. If the similarity exceeds a predetermined threshold, it is determined that the two finger print images are same. In this case, a corresponding user is identified as a right user.

The storing unit 44 stores feature points data from the MICOM 42. The processing memory 46 as a buffer memory carries out loading registered feature points data in response to a loading control signal from the MICOM 42. The processing memory 46 further temporarily stores differences of positions and directions between corresponding feature points of the two fingerprint images obtained by comparing the registered feature points data with the target feature points data. The processing memory 46 may be a random access memory whose storing capacity ranges from 4 k to 60 k.

Figure 2:
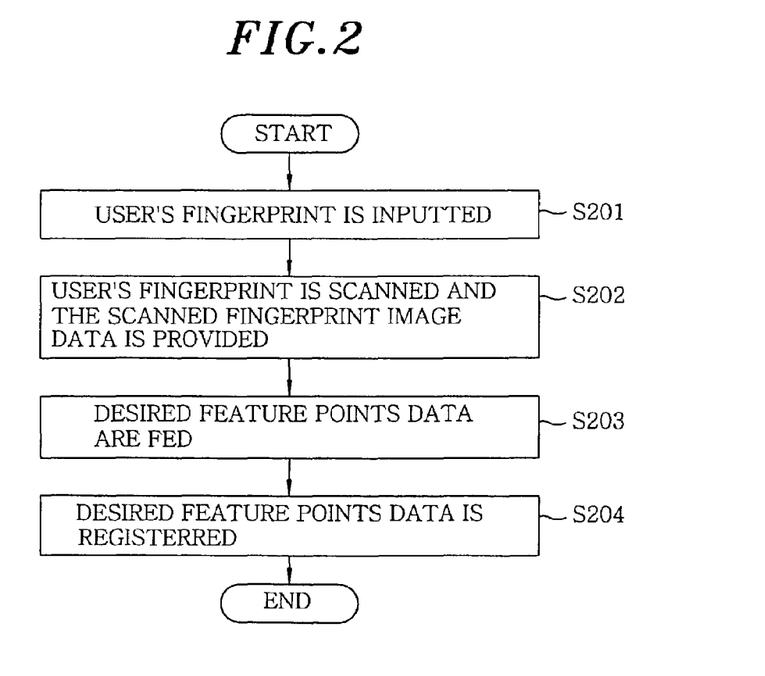
FIG. 2 is a flow chart representing a process of registration of a fingerprint image of a user in a security token circuit.

FIG. 2 is a flow chart representing a process of registration of a fingerprint image of a user in a security token circuit, e.g., the security token circuit 40. First, at step S201, a user inputs his or her fingerprint into the fingerprint image input circuit 10 to register his or her own fingerprint image.

Then, at step S202, the fingerprint image input circuit 10 scans the user's fingerprint to thereby provide scanned fingerprint image data to the CPU 32 in the host 30 through the I/O interface 20.

At step S203, the CPU 32 in the host 30 receives the scanned fingerprint image data from the fingerprint image input circuit 10 and extracts feature points from the scanned fingerprint image data. Then, the CPU 32 selects desired feature points in a predetermined manner from the extracted feature points to thereby store the desired feature points data in the memory 34 and feeds the desired feature points data to the MICOM 42 in the security token circuit 40 through the I/O interface 20. Then, at step S204, the MICOM 42 in the security token circuit 40 stores the desired feature points data as registered feature points data in the storing unit 44. Then, the process of registration of the fingerprint image of the user is ended.

Figure 3A:
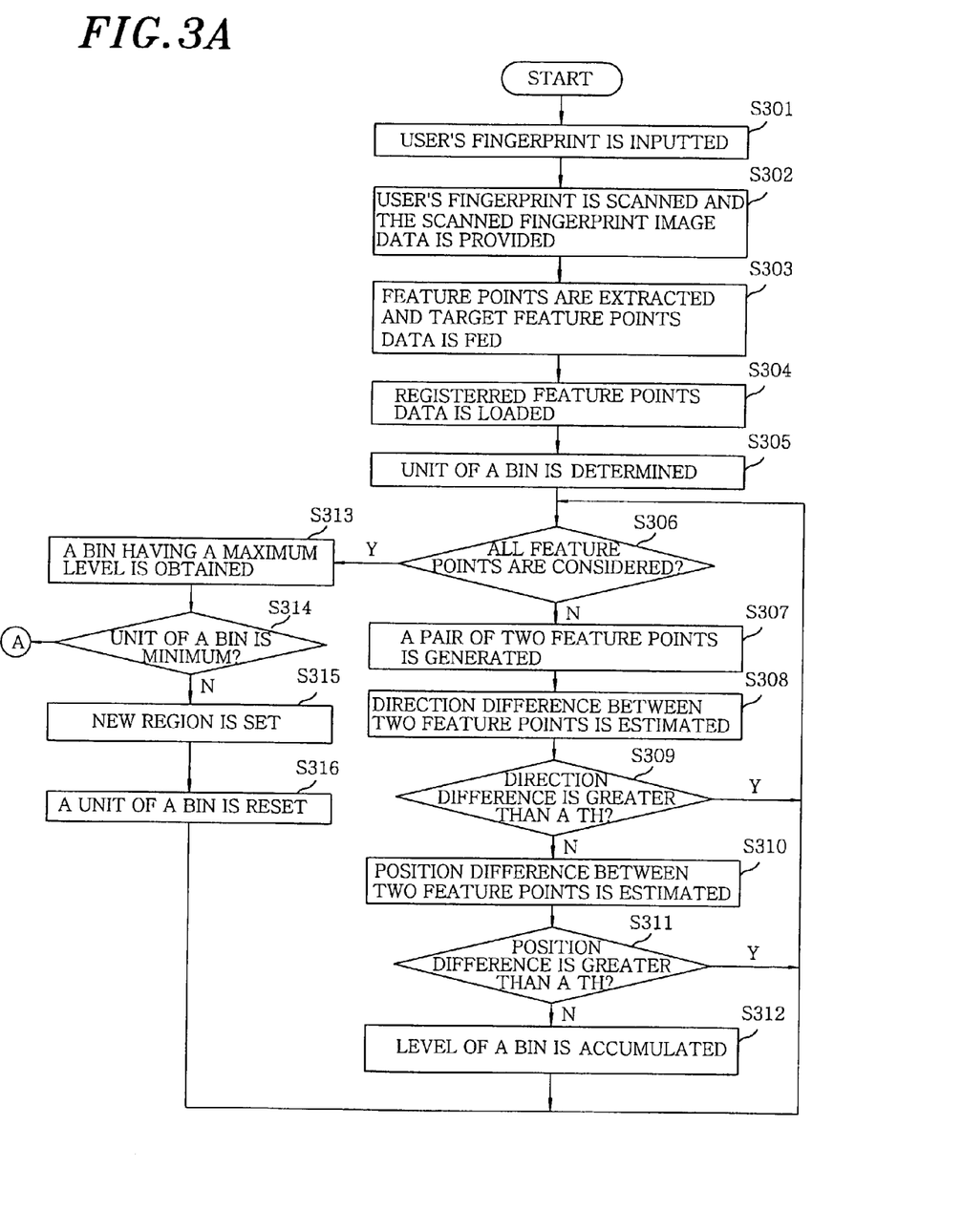
FIGS. 3A and 3B depict a detailed flow diagram of a total process of a method for authenticating a user by employing feature points of a fingerprint image of the user.
Figure 3B:
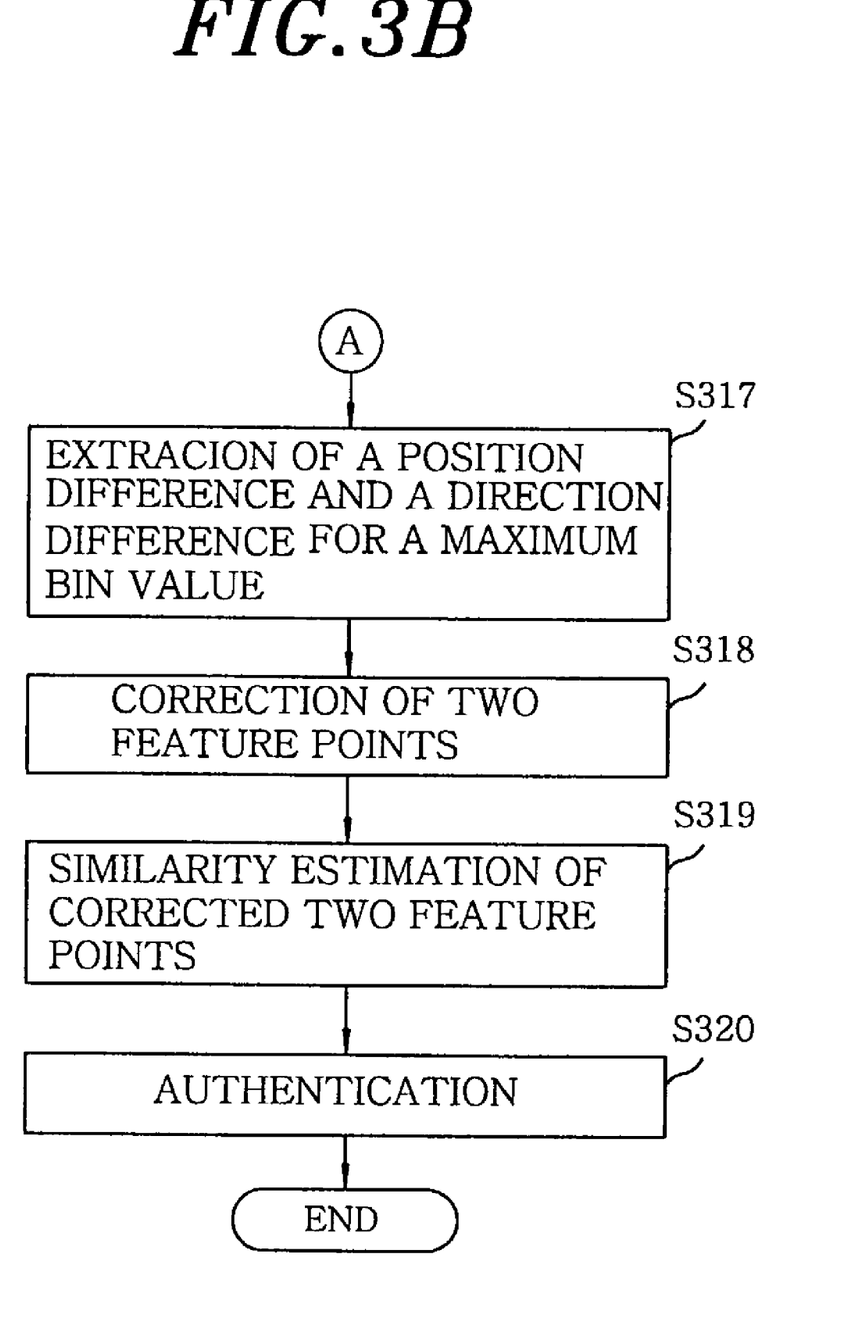

FIGS. 3A and 3B depict a detailed flow diagram of a total process of a method for authenticating a user by employing feature points of a fingerprint image of the user in accordance with a preferred embodiment of the present invention.

After the fingerprint image registration process is ended as described in the above with reference to FIG. 2, at step S301, a user inputs a smart card or a universal serial bus (USB) token and at the same time, inputs his or her fingerprint into the fingerprint image input circuit 10 to authenticate his or her own fingerprint image.

Then, at step S302, the fingerprint image input circuit 10 scans the user's fingerprint to thereby provide the scanned fingerprint image data to the CPU 32 in the host 30 through the I/O interface 20.

At step S303, the CPU 32 in the host 30 receives the scanned fingerprint image data from the fingerprint image input circuit 10 and extracts feature points from the scanned fingerprint image data. Then, the CPU 32 selects desired feature points in a predetermined manner from the extracted feature points to thereby store the desired feature points data in the memory 34 and provides the desired feature points data as target feature points data to the security token circuit 40 through the I/O interface 20.

Then, at step S304, the MICOM 42 in the security token circuit 40 retrieves the registered feature points data previously stored in the storing unit 44 and loads the registered feature points data to evaluate the feature points thereof.

Figure 4A:
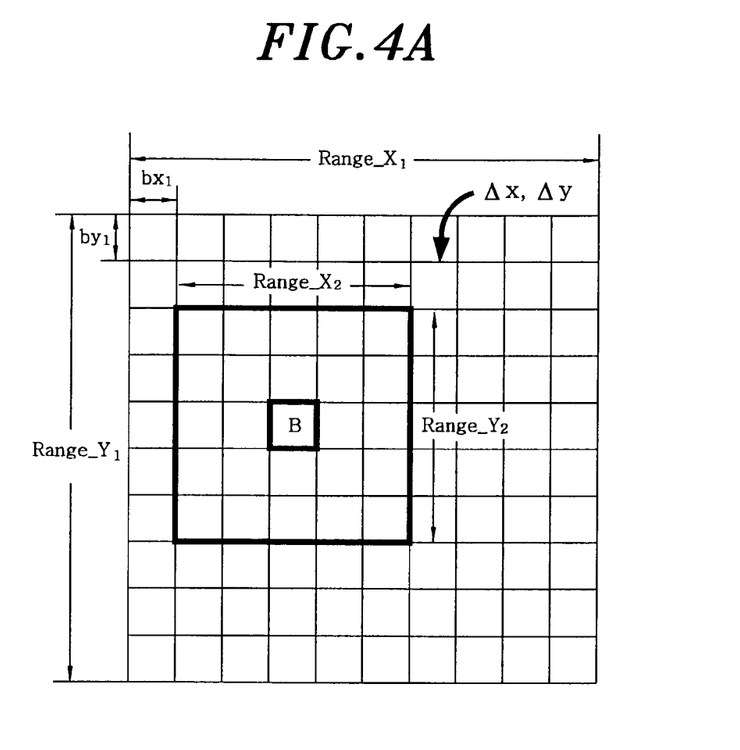
FIGS. 4A and 4B present examples of two-dimensional bins obtained in accordance with bin accumulation process shown in FIGS. 3A and 3B.
Figure 4B:
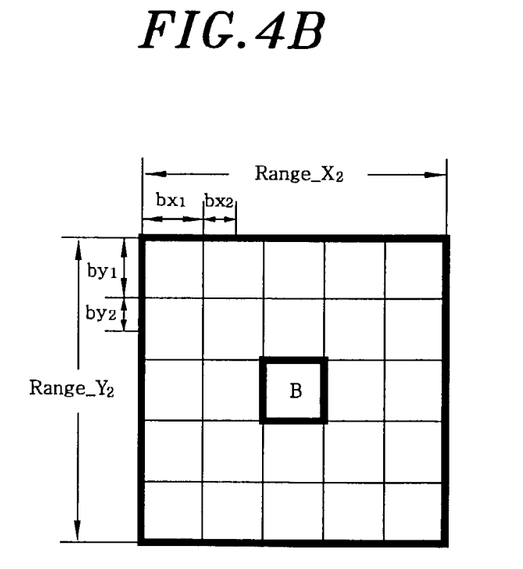

Then, at step S305, the MICOM 42, in order to extract differences of position and direction of pairs of two feature points, i.e., a registered feature point and a corresponding target feature point, sets a region for accumulating differences of position and direction of the two feature points as illustrated in FIG. 4A and then determines units of each bin in view of position ($bx_1$, $by_1$) and direction (not shown in FIGS. 4A and 4B). FIGS. 4A and 4B present examples of two-dimensional bins obtained in accordance with bin accumulation process shown in FIGS. 3A and 3B.

In this case, the magnitude of the bins varies starting from a large initial value to a smaller value. In FIGS. 4A and 4B, "Range_$X_1$" represents an initial (first) X-axis region which relates to a displacement corresponding to a detective X-axis direction; "Range_$Y_1$" represents an initial (first) Y-axis region which relates to a displacement corresponding to a detective Y-axis direction; "Range_$X_2$" represents a second X-axis region set within the initial X-axis region surrounding a maximum bin region (represented as "B" therein); and "Range_$Y_2$" represents a second Y-axis region set within the initial Y-axis region surrounding the maximum bin region. In FIGS. 4A and 4B, $bx_1$ represents an initial X-direction unit; $bx_2$ represents a second X-direction unit smaller than $bx_1$; $by_1$ represents an initial Y-direction unit; and $by_2$ represents a second Y-direction unit smaller than $by_1$.

Next, at step S306, there is checked whether all feature points (i.e., all pairs of the two feature points) are considered. If all feature points (i.e., all pairs of the two feature points) are considered, then the process goes to step S313; and if all feature points are not considered, then the process flows to step S307.

At step S307, a pair of two feature points, i.e., a registered feature point and a target feature point is generated and then, at step S308, a direction difference between the two feature points is estimated.

At step S309, if the direction difference is not greater than a threshold (TH), then the process goes to step S310; and if otherwise, the process returns to step S306. At step S310, a position difference between the two feature points is estimated.

At step S311, if the position difference is not greater than a threshold (TH), then the process goes to step S312; and if otherwise, the process returns to step S306. At step S312, a level of a bin corresponding to each of a position difference and a direction difference in a region is elevated or accumulated, wherein the region is predetermined, e.g., in the processing memory 46.

Meanwhile, at step S313, a bin having a maximum level is obtained. Then, at step S314, there is checked whether a unit of a bin is minimum. If the unit of a bin is not minimum, the process goes to step S315. At step S315, a unit of a bin is varied from a large initial value to a smaller value, thereby setting a new region smaller than the region having the initial value. Then at step S316, a unit of bin for each of a position difference and a direction difference is reset. Then, the process returns to step S306.

At step S314, if the unit of a bin is minimum, the process flows to step S317 through a tab "A" as shown in FIGS. 3A and 3B. At step S317, a position difference and a direction difference corresponding to a maximum bin value, e.g., a position difference and a direction difference corresponding to "B" shown in FIG. 4B.

At step S318, the MICOM 42 corrects the registered feature points data and the target feature points data based on the extracted position difference and direction difference. Then, at step S319, the MICOM 42 estimates a similarity between the corrected two feature points. Finally, at step S320, there is performed an authentication therefor. Namely, if the similarity is greater than a predetermined threshold, the two fingerprint images are determined to be same; and if otherwise, the two fingerprint images are determined to be different from each other. Then, the process is ended.

The above-mentioned bin region which has been initially set relates to a position movement and a rotation of direction. In general, a bin for a position movement relates to a size of a fingerprint image. For example, in accordance with another embodiment of the present invention, if there is used a fingerprint image of about 300×300 pixels and a position movement tracing for about 100 pixels is possible, each of the "Range_$X_1$" and "Range_$y_1$" should be set as about 200 pixels. This represents that position tracing of about 100 pixels in up/down and right/left directions is possible. For rotational region, 60 degrees of rotation (30 degrees for each of the right and left direction) should be possible.

For a bin for position, each of the $bx_1$ and $by_1$ may b initially set as 8 and then decreases to 4, 2; a unit of bin for direction may be initially set as 4 and then decreases to 2, 1. In this case, a region of position should be decreased starting from one of about 200 pixels to about 100 pixels, about 50 pixels; and a region of direction should be decreased starting from one of 60 degrees to 30 degrees, 15 degrees. With this configuration, a necessary memory for each step may be same and accordingly, a maximum memory to be needed can be reduced.

Meanwhile, in accordance with another embodiment of the present invention, a unit to increase a level of a bin may be "1" or other value. Besides a corresponding bin, its neighborhood bin may also be accumulated. In this case, the so-called Gaussian distribution can be utilized.

In accordance with the present invention, there is provided an apparatus and method for authenticating a user by correcting a phase of registered fingerprint image to be identical with that of target fingerprint image and thereafter, comparing feature points of the two fingerprint images in order to estimate similarity therebetween under an environment in which hardware resources of a smart card, a universal serial bus (USB) token or the like are limited. In this case, since the registered fingerprint image of the user is stored in a memory within a security token and then authentication between the registered fingerprint image and the target fingerprint image is performed in the security token, the outflow of the fingerprint data of the user is prevented to thereby enhance the safety thereof.

While the present invention has been described with respect to certain preferred embodiments only, other modifications and variations may be made without departing from the scope of the present invention as set forth in the following claims.

What is claimed is:

1. An apparatus for authenticating a user by employing feature points of a fingerprint image of the user, comprising:
   a fingerprint image input circuit for scanning a fingerprint of a user to be registered, thereby providing a first fingerprint image and scanning a fingerprint of a user to be authenticated, thereby providing a second fingerprint image;
   a host circuit for providing data for feature points of the first fingerprint image having been registered as registered feature points data corresponding to the first fingerprint image and data for feature points of the second fingerprint image to be authenticated as target feature points data corresponding to the second fingerprint image;
   a security token circuit for estimating a position difference and a direction difference between pairs of a registered feature point and a target feature point and correcting the two feature points based on the position difference and the direction difference to thereby provide authentication result data to the host circuit; and
   an I/O interfacing circuit for performing interfacing fingerprint images between the fingerprint image input circuit and the host circuit and feature points data and authentication result data between the host circuit and the security token circuit.

2. The apparatus of claim 1, wherein the security token circuit corrects the registered feature points data and the target feature points data based on the extracted position difference and direction difference and then estimates a similarity between the corrected two feature points; and if the similarity is greater than a predetermined threshold, determines that the two fingerprint images are same and accordingly, performs a normal authentication process for the user.

3. The apparatus of claim 1, wherein the security token circuit corrects includes;
a MICOM for feeding the registered feature points data and after receiving the target feature points data from the host circuit, retrieving the registered feature points data previously stored and loading the registered feature points data and then comparing the registered feature points data with the target feature points data to thereby generate a position difference and a direction difference of each pair of two feature points by employing the so-called Hough Transform technique and accumulating the differences in a corresponding bin within a memory region, wherein a unit of a bin relating the accumulation is varied starting from a large initial value to a smaller value in order to decrease the memory amount and thereafter, when the unit of bin reaches to the minimum value, within a corresponding new region, final differences of positions and directions of each pair of two feature points are obtained and feature points of the two fingerprint images are corrected based on the obtained differences;
a storing unit for storing the feature points data from the MICOM; and
a processing memory for carrying out loading registered feature points data in response to a loading control signal from the MICOM and further temporarily storing the differences of positions and directions between corresponding feature points of the two fingerprint images.

4. The apparatus of claim 3, wherein the processing memory is a random access memory whose storing capacity ranges from 4 k to 60 k.

5. The apparatus of claim 1, wherein the host circuit further includes a memory for storing therein the registered feature points data and the target feature points data.

6. A method for registering and authenticating a fingerprint image of a user for use in a system including a fingerprint image input circuit, a host and a security token circuit, the method comprising the steps of:
(a) inputting a fingerprint of the user into the fingerprint image input circuit;
(b) scanning, by the fingerprint image input circuit, the fingerprint of the user to thereby provide scanned fingerprint image data to a CPU in the host;
(c) extracting feature points from the fingerprint image data and then selecting desired feature points in a predetermined manner from the extracted feature points to thereby store the desired feature points data in a memory and feeding the desired feature points data to the MICOM in the security token circuit through an I/O interface;
(d) storing the desired feature points data as registered feature points data in a storing unit; and
(e) estimating a position difference and a direction difference between pairs of a registered feature point and a scanned feature point and correcting the two feature points based on the position difference and the direction difference to thereby provide authentication result data to the host circuit.

7. A method for authenticating a user by employing feature points of a fingerprint image of the user for-use in a system including a fingerprint image input circuit, a host and a security token circuit, the method comprising the steps of:
(a) registering feature points data of a fingerprint image of the user as registered feature points data into the security token circuit;
(b) inputting a fingerprint of a user to be authenticated into the fingerprint image input circuit;
(c) scanning the fingerprint of the user to thereby provide scanned fingerprint image data to the host;
(d) receiving the scanned fingerprint image data and extracting feature points from the scanned fingerprint image data and then selecting desired feature points in a predetermined manner from the extracted feature points to thereby provide the desired feature points data as target feature points data to the security token circuit;
(e) in the security token circuit, estimating the registered feature points data and the target feature points data, thereby obtaining a position difference and a direction difference of each pair of two feature points and then the differences for all pairs of two feature points are accumulated in a corresponding bin within a memory region and then obtaining a bin having a maximum value as a maximum bin value and by varying a unit of a bin starting from a large initial value to a smaller value, thereby setting a new region and then repeating this process until the unit of a bin reaches to a minimum value and thereafter, when the unit of bin reaches to the minimum value within a corresponding new region, obtaining final differences of positions and directions of each pair of two feature points; and
correcting the feature points of the two fingerprint images based on the obtained differences; and
estimating a similarity between the corrected feature points to thereby generate authentication result data; and
providing the authentication result data to the host.

8. The method of claim 7, wherein in said step (e), the registered feature points data and the target feature points data are corrected based on the extracted position difference and direction difference and then a similarity between the corrected two feature points is estimated and then, if the similarity is greater than a predetermined threshold, the two fingerprint images are determined to be same and if otherwise, the two fingerprint images are determined to be different from each other.

9. The method of claim 7, wherein the security token circuit includes;
a storing unit for storing the feature points data from the MICOM; and
a processing memory for carrying out loading registered feature points data in response to a loading control signal from the MICOM and further temporarily storing the differences of positions and directions between corresponding feature points of the two fingerprint images.

10. The method of claim 7, wherein the processing memory is a random access memory whose storing capacity ranges from 4 k to 60 k.

11. The method of claim 7, wherein a CPU in the host receives the scanned fingerprint image data from the fingerprint image input circuit and extracts feature points from the scanned fingerprint image data and then selects desired feature points in a predetermined manner from the extracted feature points to thereby provide the desired feature points data in the memory and provides the desired feature points data as target feature points data to the security token circuit through the I/O interface.

12. The method of claim 7, wherein the host further includes a memory for storing therein the registered feature points data and the target feature points data received from the CPU.

* * * * *